United States Patent
McCaffrey (10) Patent No.: US 11,193,376 B2
(45) Date of Patent: Dec. 7, 2021

(54) DISK SUPPORTED DAMPER FOR A GAS TURBINE ENGINE

(71) Applicant: United Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/785,999

(22) Filed: Feb. 10, 2020

(65) Prior Publication Data
US 2021/0246790 A1    Aug. 12, 2021

(51) Int. Cl.
*F01D 5/10*    (2006.01)

(52) U.S. Cl.
CPC ............ *F01D 5/10* (2013.01); *F05D 2220/32* (2013.01); *F05D 2240/24* (2013.01); *F05D 2260/96* (2013.01)

(58) Field of Classification Search
CPC .... F01D 5/10; F05D 2220/32; F05D 2240/24; F05D 2260/96
See application file for complete search history.

(56) References Cited

U.S. PATENT DOCUMENTS

| | | | | |
|---|---|---|---|---|
| 3,037,741 A * | 6/1962 | Tuft | ........................ | F01D 5/22 416/221 |
| 3,266,770 A * | 8/1966 | Harlow | ..................... | F01D 5/22 416/92 |
| 3,610,778 A * | 10/1971 | Suter | ........................ | F01D 5/22 416/210 R |
| 4,182,598 A | 1/1980 | Nelson | | |
| 5,143,517 A | 9/1992 | Vermont | | |
| 5,478,207 A | 12/1995 | Stec | | |
| 5,700,133 A * | 12/1997 | Surdi | ........................ | F01D 5/22 416/248 |
| 6,851,932 B2 * | 2/2005 | Lagrange | .................. | F01D 5/26 416/190 |
| 8,277,186 B2 * | 10/2012 | Tanaka | .................... | F01D 5/326 416/179 |
| 8,985,956 B2 * | 3/2015 | Hogberg | ................. | F01D 5/284 416/193 R |

(Continued)

FOREIGN PATENT DOCUMENTS

SU    1127979 A1    12/1984

OTHER PUBLICATIONS

European Search Report dated Jul. 12, 2021 issued for European Patent Application No. 21156256.6.

*Primary Examiner* — Justin D Seabe
*Assistant Examiner* — Theodore C Ribadeneyra
(74) *Attorney, Agent, or Firm* — Bachman & LaPointe, P.C.

(57) ABSTRACT

A rotor disk assembly for a gas turbine engine includes a rotor disk that defines an axis; and a damper pivot support that extends from a rim of the rotor disk, the damper pivot support comprising an aperture that defines a pivot axis parallel to the axis. A method to dampen a rotor blade of a gas turbine engine, includes independently pivoting a first damper and a second damper of a damper assembly about the pivot axis to respectively contact a first blade and a second blade in response to centrifugal force below a platform of the respective first blade and second blade.

25 Claims, 6 Drawing Sheets

(56) References Cited

U.S. PATENT DOCUMENTS

| | | |
|---|---|---|
| 9,279,332 B2 | 3/2016 | Zhang et al. |
| 9,366,142 B2 * | 6/2016 | Butkiewicz ............... F01D 5/08 |
| 9,506,372 B2 * | 11/2016 | Schoenhoff .............. F01D 5/22 |
| 10,472,975 B2 * | 11/2019 | Kareff ....................... F01D 5/22 |
| 10,731,479 B2 * | 8/2020 | Thistle ...................... F01D 5/26 |

* cited by examiner

DISK SUPPORTED DAMPER FOR A GAS TURBINE ENGINE

BACKGROUND

This application relates generally to a damper assembly and more specifically to a damper assembly mounted to a disk between blades of a gas turbine engine.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases.

The turbine section includes rotatable turbine blade and stationary turbine vane arrays. Each of the turbine blades is spaced apart from an adjacent turbine blade to accommodate movement and expansion during operation. The turbine blades typically include a root that attaches to a rotor disk, a platform, and an airfoil that extends radially outwardly from the platform.

Hot combustion gases that flow over the platform are prevented from leaking between adjacent turbine blades by a seal, as components below the platform are generally not designed to operate for extended durations exposed to the elevated temperatures of the hot combustion gases. In addition to the seal, a damper mounted to the seal and the platforms between adjacent turbine blades dissipates vibration through frictional contact between the damper and an underplatform surface of the two adjacent turbine blade platforms.

Support of such dampers is typically accomplished with posts and shelf features on the blade platforms. Although effective, the damper mass on the inboard surface of the platform may increase bending stress which may be of particular concern to a Ceramic Matrix Composite (CMC) blade. The overall structural capability may be negatively impacted if the platform is made thicker to handle the increased bending stresses such that the entire platform would require additional thickness to support both the damper and the heavier platform. This may negate some of the advantages of the Ceramic Matrix Composite (CMC) blade.

SUMMARY

A rotor disk assembly for a gas turbine engine according to one disclosed non-limiting embodiment of the present disclosure includes a rotor disk that defines an axis; and a damper pivot support that extends from a rim of the rotor disk, the damper pivot support comprising an aperture that defines a pivot axis parallel to the axis.

A further aspect of the present disclosure includes that the damper pivot support extends from each of a multiple of lugs of the disk.

A further aspect of the present disclosure includes that the damper pivot support extends from every other of a multiple of lugs of the disk.

A further aspect of the present disclosure includes a damper assembly pivotably attached to the damper pivot support, the damper assembly pivotable about the pivot axis.

A further aspect of the present disclosure includes a first damper and a second damper pivotably attached to the damper pivot support, the first damper and the second damper independently pivotable about the pivot axis.

A further aspect of the present disclosure includes that the first damper comprises a first contact surface and the second damper comprise a second contact surface.

A further aspect of the present disclosure includes that the first contact surface is shaped to contact a suction side of a first blade and the second contact surface is shaped to contact a pressure side of a second blade.

A further aspect of the present disclosure includes that the first contact surface and the second contact surface are angled toward the rim.

A further aspect of the present disclosure includes that the first contact surface is shaped to contact the suction side of the first blade below a platform of the first blade and the second contact surface is shaped to contact the pressure side of the second blade below a platform of the second blade.

The assembly as recited in claim 6, further comprising a first counterweight that extends from the first contact surface opposite the pivot axis and a second counterweight that extends from the second contact surface opposite the pivot axis.

A further aspect of the present disclosure includes that the first contact surface and the second contact surface are angled away from the rim.

A rotor disk assembly for a gas turbine engine according to one disclosed non-limiting embodiment of the present disclosure includes a rotor disk that defines an axis; a first rotor blade mounted within a first blade slot in a rim of the rotor disk; a second rotor blade mounted within a second blade slot in the rim of the rotor disk; a damper pivot support that extends from a rim of a lug in the rotor disk, the lug between the first blade slot and the second blade slot, the damper pivot support comprising an aperture that defines a pivot axis parallel to the axis; a first damper independently pivotable about the pivot axis to contact the first blade in response to centrifugal force; and a second damper independently pivotable about the pivot axis to contact the second blade in response to centrifugal force.

A further aspect of the present disclosure includes that the first damper comprises a first contact surface and the second damper comprise a second contact surface, the first contact surface is shaped to contact a suction side of a first blade and the second contact surface is shaped to contact a pressure side of a second blade.

A further aspect of the present disclosure includes that the first contact surface is shaped to contact the suction side of the first blade below a platform of the first blade and the second contact surface is shaped to contact the pressure side of the second blade below a platform of the second blade.

A further aspect of the present disclosure includes that the first contact surface and the second contact surface are angled toward the rim.

A further aspect of the present disclosure includes a first counterweight that extends from the first contact surface opposite the pivot axis and a second counterweight that extends from the second contact surface opposite the pivot axis.

A further aspect of the present disclosure includes that the first contact surface and the second contact surface are angled away from the rim.

A method to dampen a rotor blade of a gas turbine engine according to one disclosed non-limiting embodiment of the present disclosure includes pivotably mounting a damper assembly to a damper pivot that extends from a rim of a lug in a rotor disk, the lug between a first blade slot and a second blade slot of the rotor disk, the damper pivot support defines a pivot axis parallel to an axis defined by the rotor disk; and independently pivoting a first damper and a second damper of the damper assembly about the pivot axis to respectively contact a first blade and a second blade in response to centrifugal force, a first contact surface of the first damper and a second contact surface of the second damper contacting the respective blades below a platform of the respective first blade and second blade.

A further aspect of the present disclosure includes that the first contact surface and the second contact surface are angled toward the rim and pivot away from the rim in response to the centrifugal force.

A further aspect of the present disclosure includes that the first contact surface and the second contact surface are angled away from the rim and pivot toward the rim in response to the centrifugal force.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
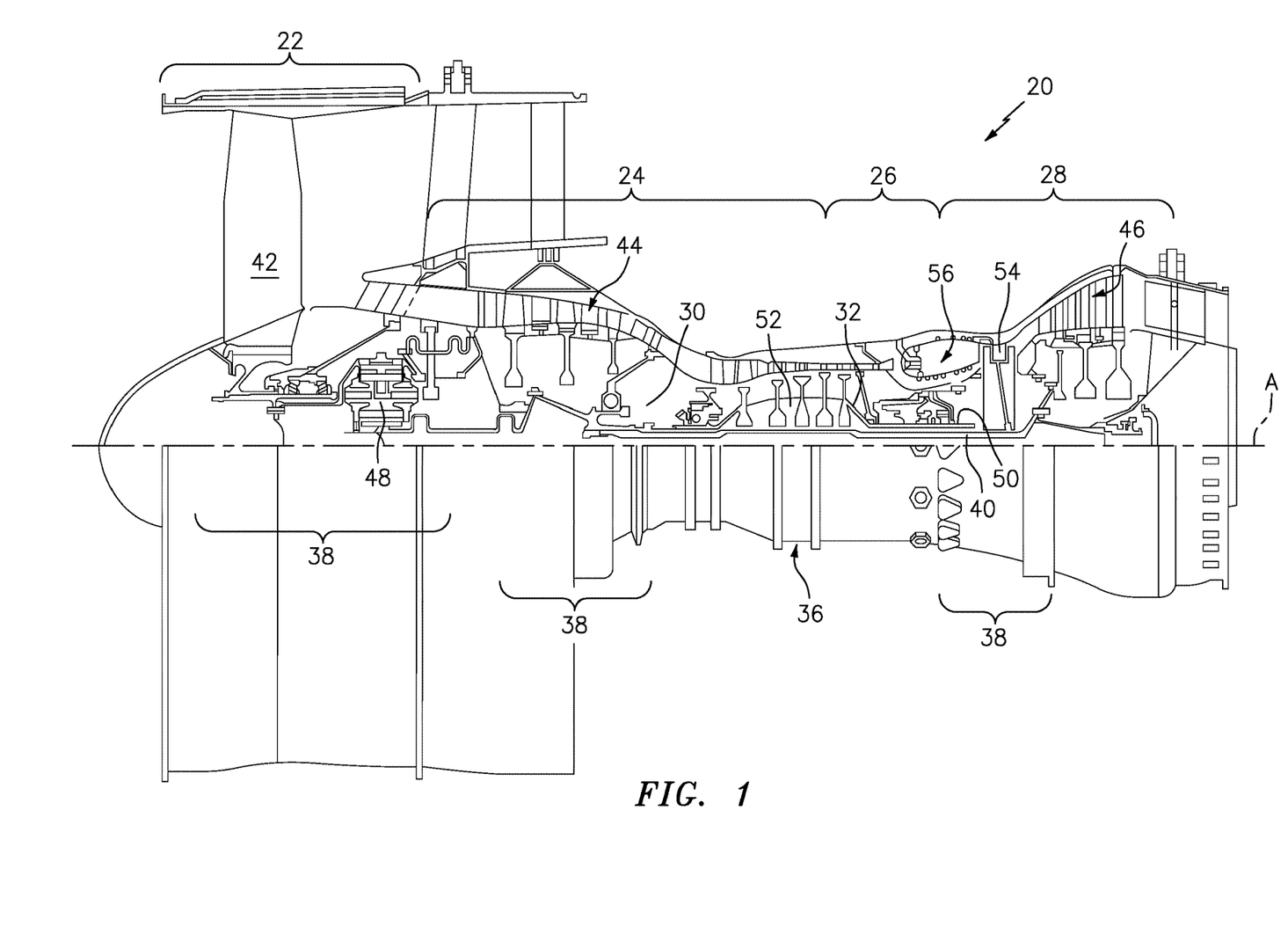
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a high temperature core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
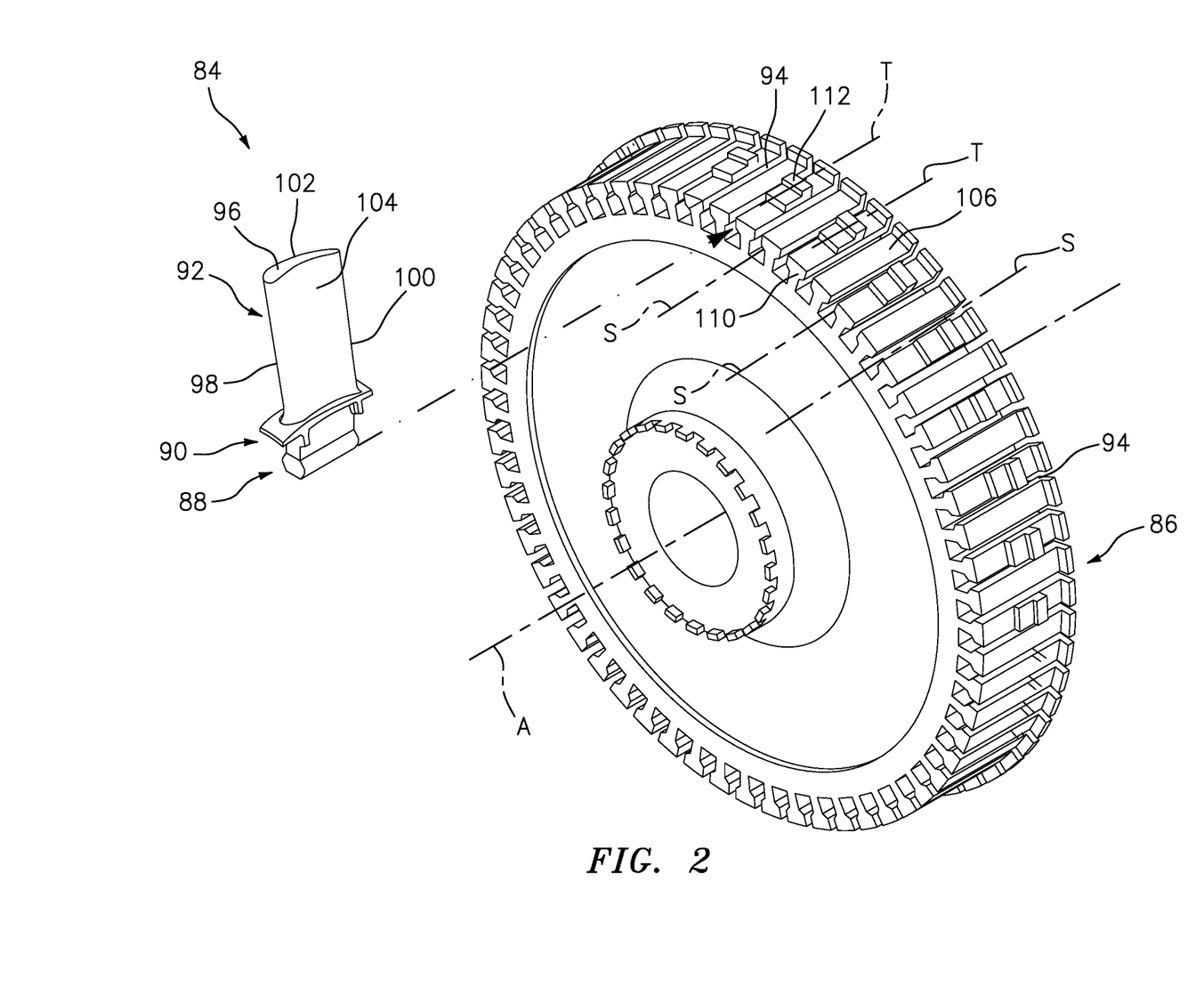
FIG. 2 is an exploded view of a rotor assembly with a single representative ceramic matrix composite turbine blade.

With reference to FIG. 2, a rotor assembly 60 such as a turbine rotor assembly includes an array of blades 84 (one shown) circumferentially disposed around a disk 86. The disk 86 may be subtractive or additive manufactured of nickel-based super alloys that operate in high temperature environments, such as, for example, environments typically encountered by aerospace and gas turbine engine hot section components. In some embodiments, the nickel-based alloy may be Inconel 718, Waspaloy, IN-100, etc.

Each blade 84 includes a root region 88, a platform 90 and an airfoil 92. The platform 90 separates a gas path side inclusive of the airfoil 92 and a non-gas path side inclusive of the root region 88. Although the platform 90 is illustrated as integral in the illustrated embodiment, other geometries in which the platform 90 is a separate component may alternatively be utilized. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Each blade root region 88 is received within one blade slot 94 in a rim 106 of the disk 86 such that the airfoil 92 extends therefrom and the platform 90 at least partially protects the rim 106. In one example, the blade root region 88 is generally teardrop shaped. However, other shapes such as fir-trees, flared, and other shapes are contemplated. In the illustrated embodiment, a blade 84 is disclosed in detail, however other composite components which require an attachment such as the root region 88 to include but not be limited to vanes, blade outer air seals, struts, etc., will also benefit herefrom.

Each blade 84 may be manufactured of a ceramic matrix composite (CMC) or organic matrix composite (OMC) material that typically includes prepreg ceramic plys that include prepreg ceramic fiber tows, the tows in each ply lying adjacent to one another in a planar arrangement such that each ply has a unidirectional orientation. Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3$/$Al_2O_3$), organic matrix composite (e.g. carbon fiber epoxy) or combinations thereof. The CMC may have increased elongation, fracture toughness, thermal shock, dynamic load capability, and anisotropic properties as compared to a monolithic ceramic structure. Other Ceramic matrix composite (CMC) materials may utilize tackified ceramic fabric/fibers whereby the fibers have not been infiltrated with matrix material, 3D weave architectures of dry fabrics, and others. Although CMCs are primarily discussed in the disclosed embodiment, other such non-metallic materials may also be utilized to form the component.

Manufacture of the blade 84 typically includes laying up pre-impregnated composite fibers having a matrix material already present (prepreg) to form the geometry of the part (pre-form), autoclaving and burning out the pre-form, infiltrating the burned-out pre-form with the melting matrix material, then final machining and treatments of the pre-form. Infiltrating the pre-form may include depositing the ceramic matrix out of a gas mixture, pyrolyzing a pre-ceramic polymer, chemically reacting elements, sintering, generally in the temperature range of 1700-3000 F (925-1650 C), or electrophoretically depositing a ceramic powder. With respect to airfoils, the CMC may be located over a metal spar to form only the outer surface of the airfoil.

In the illustrated embodiment, the root region 88 may include a flared surface adjacent to a neck. However, other shapes such as teardrop, fir-trees, and other shapes are contemplated. The relatively simple root region 88 facilitates a relatively short neck. The root region 88 may be silicon plasma sprayed to facilitate final machining of the shape into the CMC materials. The blade 84 may include relatively simple geometries that are loaded primarily in one direction (radial pull) that have been created in ceramic matrix composite (CMC) or organic matrix composite (OMC) material with relatively direct ply orientations having minimal bending.

Figure 3:
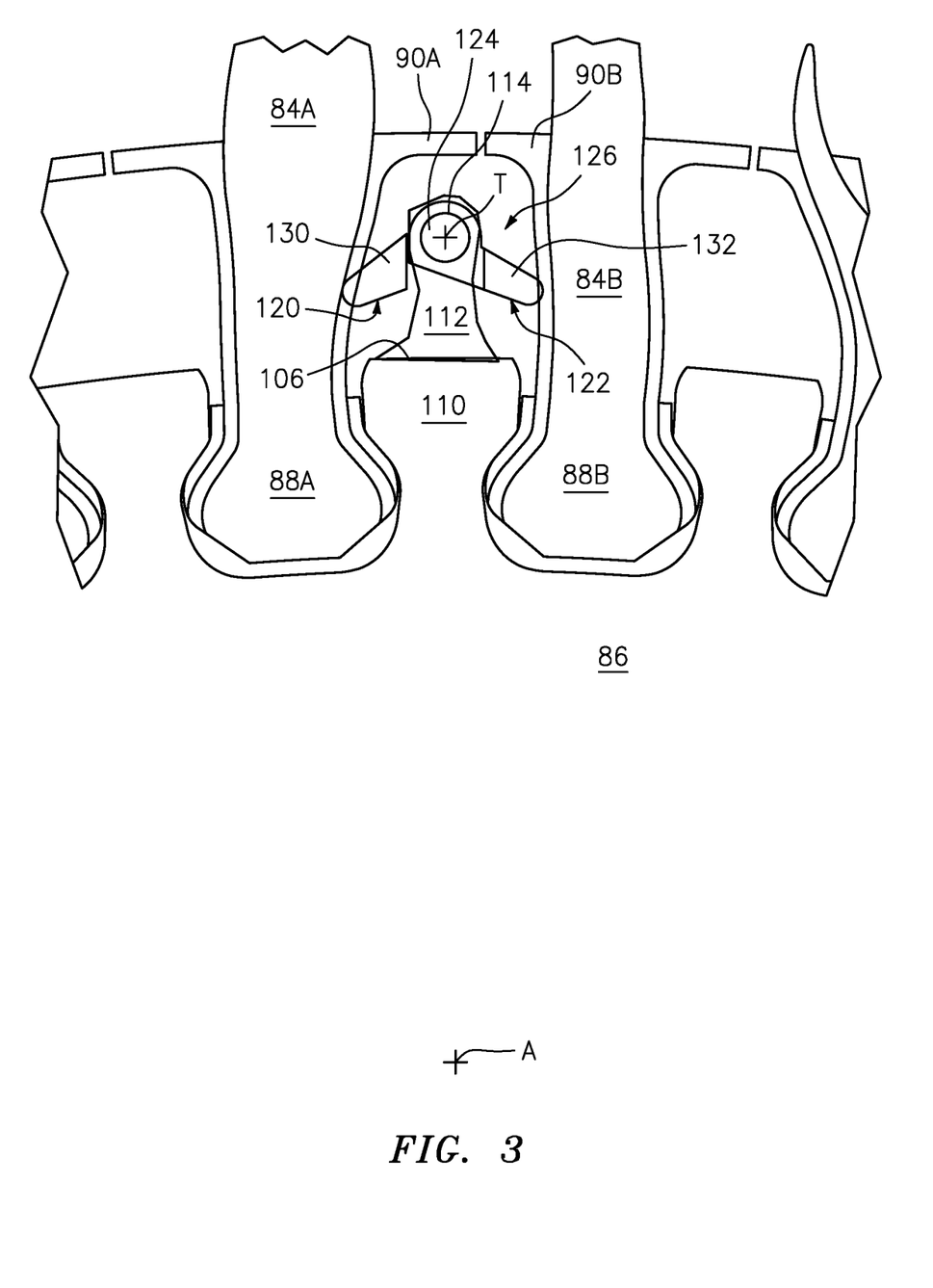
FIG. 3 is a front schematic view of a damper assembly according to one embodiment.

Each respective blade slot 94 in the rim 106 of the disk 86 is separated by a lug 110 which may include a damper pivot support 112 that extends therefrom (also shown in FIG. 3). The damper pivot support 112 extends from the rim 106 but may be integral therewith. That is, the damper pivot support 112 is manufactured with the disk 86. The damper pivot support 112 may be located on each lug 110 or alternatively, on every other lug 110.

The damper pivot support 112 includes an aperture 114 that defines a pivot axis T parallel to an axis such as the engine axis A or an axis S of the blade slot 94. Typically, the axis S of each blade slots 94 are at an angle to the engine axis A, generally between 0-20 degrees. This is to align the airfoil and root geometry, even though it may increase the disk attachment stresses. "Parallel" as defined herein is a relationship in a cylindrical coordinate system, depending on the orientation of the discrete features created on a cylindrical surface.

With reference to FIG. 3, a first damper 120 and a second damper 122 are mounted to the damper pivot support 112 by a pin 124 or other retainer to form a damper assembly 126. The first damper 120 and the second damper 122 are independently pivotable about the pivot axis T to contact a respective first blade 84A and a second blade 84B in response to a centrifugal force from the rotation of the disk 86. The first damper 120 and the second damper 122 may be manufactured of a metal alloy such as a cobalt based alloy, a CMC, a monolithic ceramic such as silicon nitride, or combinations thereof.

Figure 4:
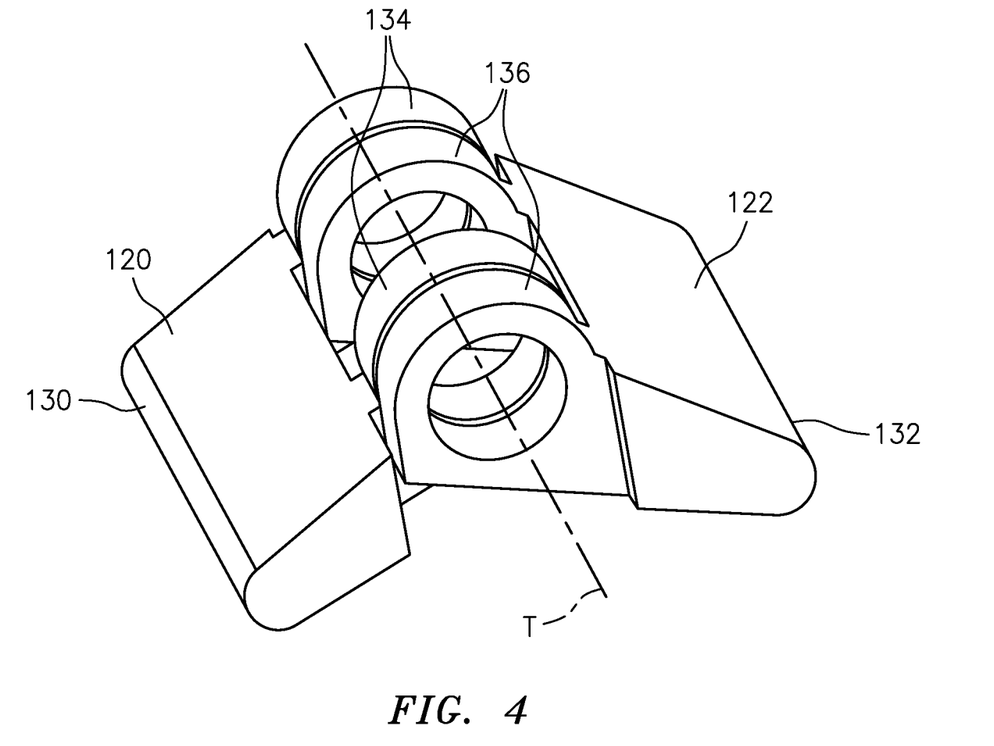
FIG. 4 is a perspective view of the dampers of the damper assembly of FIG. 3.

The first damper 120 and the second damper 122 include a respective first contact surface 130 and a second contact surface 132 that are respectively shaped to the first and second blade 84A, 84B. That is, the first contact surface 130 contacts a pressure side of the first blade 84A while the second contact surface 132 contacts a suction side of the second blade 84B. The first contact surface 130 and the second contact surface 132 are opposite a respective hinge section 134, 136 (FIG. 4). The respective hinge sections 134, 136 form apertures which fit around the pin 124 such that the first contact surface 130 and the second contact surface 132 are arms which extend therefrom.

The first contact surface 130 and the second contact surface 132 contact the respective blade 84A, 84B below the respective platform 90A, 90B. The first damper 120 and the second damper 122 thereby avoid contact with the relatively more fragile platform 90A, 90B section thereby protecting the platform from otherwise significant bending stress that may compromise the ability to manufacture the blades 84 from a CMC material. The pressure side root region 88A and the section side root region 88B may be different geometrically to each other. The first contact surface 130 and the second contact surface 132 of the first damper 120 and the second damper 122 may be sculpted or otherwise specifically tailored to the contact surface of the associated blade (FIG. 4).

In this embodiment, the first damper 120 and the second damper 122 are angled toward the rim 106 of the disk 86. That is, the damper pivot axis T is outboard of the contact points between contact surfaces 130, 132 and blade roots 88A, 88B. The downward angle and the contact point inboard of damper pivot axis T prevents damper lock-up. The damper assembly 126 uses the centrifugal force to drive the first contact surface 130 and the second contact surface 132 outwardly to create damping friction, yet permits the blade to rotate the first damper 120 and the second damper 122 against the centrifugal force at various operational conditions. The contact force from the first damper 120 and the second damper 122 may also be controlled by adjusting the center of gravity and contact point of each damper 120, 122. Various modeling software and testing may be utilized to specifically tailor the weight, shape and center of gravity of each damper to define movement of the damper at various operating conditions. The damper assembly 126 independently damps two blades per location such that the damper assembly 126 may be located on every other lug 110.

Figure 5:
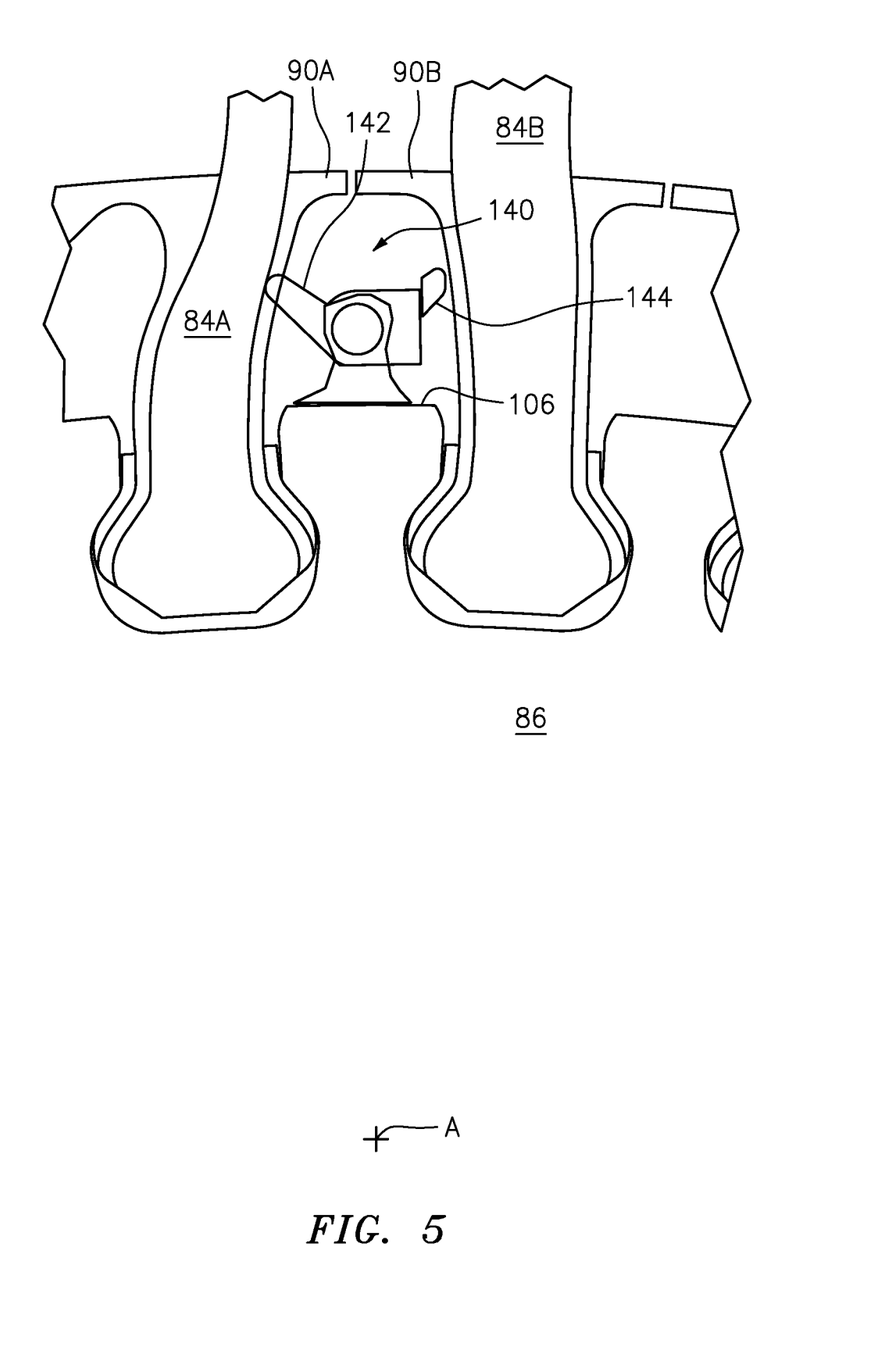
FIG. 5 is a front schematic view of a damper assembly according to another embodiment.
Figure 6:
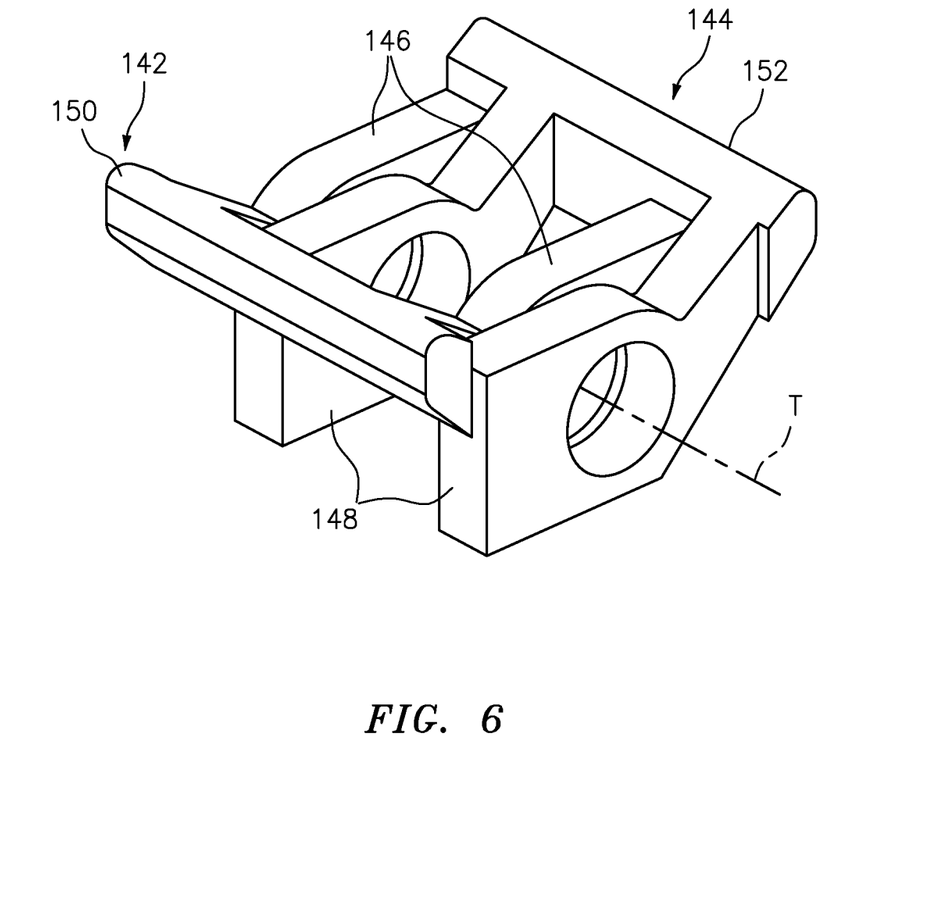
FIG. 6 is a perspective view of the counterweighted dampers of the damper assembly of FIG. 5.

With reference to FIG. 5, a damper assembly 140 according to another embodiment, includes a first damper 142 and a second damper 144 that are angled away from the rim 106 of the disk 86. The first damper 142 and the second damper 144 are counterweighted by a respective counterweight 146, 148 (FIG. 6). The counterweights 146, 148 rotate outwardly in response to the centrifugal force to drive a first contact surface 150 and a second contact surface 152 inwardly toward the respective blade 84A, 84B. That is, the first contact surface 150 and the second contact surface 152 are angled away from the rim 106 of the disk 86 but are driven toward the rim 106 of the disk 86 in response to the centrifugal force that drives the counterweights 146, 148 outwardly away from the rim 106 of the disk 86 when the disk 86 is rotating during engine operation. Use of the counterweights 146, 148 which are of a greater mass than the contact surfaces 150, 152 permit a relatively higher contact point yet maintain a relatively close pivot axis T to the rim 106 of the disk 86.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A rotor disk assembly for a gas turbine engine, comprising:
   a rotor disk that defines an axis;
   a damper pivot support that extends radially outward from a rim of the rotor disk, the damper pivot support comprising an aperture that defines a pivot axis parallel to the axis; and
   a damper assembly pivotably attached to the damper pivot support by a pin through the aperture, the damper assembly pivotable about the pivot axis.

2. The assembly as recited in claim 1, wherein the damper pivot support extends from each of a multiple of lugs of the disk.

3. The assembly as recited in claim 1, wherein the damper pivot support extends from every other of a multiple of lugs of the disk.

4. The assembly as recited in claim 1, further comprising a first damper and a second damper pivotably attached to the damper pivot support by the pin through the aperture, the first damper and the second damper independently pivotable about the pivot axis.

5. The assembly as recited in claim 4, wherein the first damper comprises a first contact surface and the second damper comprises a second contact surface.

6. The assembly as recited in claim 5, wherein the first contact surface is shaped to contact a suction side of a first blade and the second contact surface is shaped to contact a pressure side of a second blade.

7. The assembly as recited in claim 6, wherein the first contact surface and the second contact surface are angled toward the rim.

8. The assembly as recited in claim 6, wherein the first contact surface is shaped to contact the suction side of the first blade below a platform of the first blade and the second contact surface is shaped to contact the pressure side of the second blade below a platform of the second blade.

9. The assembly as recited in claim 6, wherein the first contact surface is shaped to contact the suction side of the first blade but not a platform of the first blade and the second contact surface is shaped to contact the pressure side of the second blade but not a platform of the second blade.

10. The assembly as recited in claim 5, further comprising a first counterweight that extends from the first contact surface opposite the pivot axis and a second counterweight that extends from the second contact surface opposite the pivot axis.

11. The assembly as recited in claim 10, wherein the first contact surface and the second contact surface are angled away from the rim.

12. The assembly as recited in claim 5, wherein the first contact surface and the second contact surface are opposite a respective hinge section.

13. The assembly as recited in claim 12, wherein the respective hinge sections form apertures which fit around the pin such that the first contact surface and the second contact surface are arms which extend therefrom.

14. The assembly as recited in claim 1, wherein the aperture is circular.

15. The assembly as recited in claim 14, further comprising a first damper and a second damper pivotably attached to the damper pivot support by a pin through the aperture.

16. A rotor disk assembly for a gas turbine engine, comprising:
    a rotor disk that defines an axis;
    a first rotor blade mounted within a first blade slot in a rim of the rotor disk;
    a second rotor blade mounted within a second blade slot in the rim of the rotor disk;
    a damper pivot support that extends radially outward from a rim of a lug in the rotor disk, the lug between the first blade slot and the second blade slot, the damper pivot support comprising an aperture that defines a pivot axis parallel to the axis;
    a first damper independently pivotable about a pin along the pivot axis to contact the first blade in response to centrifugal force; and
    a second damper independently pivotable about the pin along the pivot axis to contact the second blade in response to centrifugal force.

17. The assembly as recited in claim 16, wherein the first damper comprises a first contact surface and the second damper comprise a second contact surface, the first contact surface is shaped to contact a suction side of a first blade and the second contact surface is shaped to contact a pressure side of a second blade.

18. The assembly as recited in claim 17, wherein the first contact surface is shaped to contact the suction side of the first blade below a platform of the first blade and the second contact surface is shaped to contact the pressure side of the second blade below a platform of the second blade.

19. The assembly as recited in claim 18, wherein the first contact surface and the second contact surface are angled toward the rim.

20. The assembly as recited in claim 18, further comprising a first counterweight that extends from the first contact surface opposite the pivot axis and a second counterweight that extends from the second contact surface opposite the pivot axis.

21. The assembly as recited in claim 20, wherein the first contact surface and the second contact surface are angled away from the rim.

22. The assembly as recited in claim 18, wherein the first contact surface and the second contact surface are opposite a respective hinge section, the respective hinge sections form apertures which fit around the pin such that the first contact surface and the second contact surface are arms which extend therefrom.

23. A method to dampen a rotor blade of a gas turbine engine, comprising:
    pivotably mounting a damper assembly to a damper pivot that extends radially outward from a rim of a lug in a rotor disk, the lug between a first blade slot and a second blade slot of the rotor disk, a damper pivot support defines a pivot axis along a pin parallel to an axis defined by the rotor disk; and
    independently pivoting a first damper and a second damper of the damper assembly about the pivot axis of the pin to respectively contact a first blade and a second blade in response to centrifugal force, a first contact surface of the first damper and a second contact surface of the second damper contacting the respective blades below a platform of the respective first blade and second blade.

24. The method as recited in claim 23, wherein the first contact surface and the second contact surface are angled toward the rim and pivot away from the rim in response to the centrifugal force.

25. The method as recited in claim 23, wherein the first contact surface and the second contact surface are angled away from the rim and pivot toward the rim in response to the centrifugal force.

* * * * *